US006536095B2

(12) United States Patent
Perdue

(10) Patent No.: US 6,536,095 B2
(45) Date of Patent: Mar. 25, 2003

(54) PRESSED V-GROOVE PANCAKE SLIP RING

(75) Inventor: Jerry Thomas Perdue, Christiansburg, VA (US)

(73) Assignee: Litton Systems, Inc., Los Angeles, CA (US)

(*) Notice: Subject to any disclaimer, the term of this patent is extended or adjusted under 35 U.S.C. 154(b) by 0 days.

(21) Appl. No.: 09/779,475

(22) Filed: Feb. 9, 2001

(65) Prior Publication Data

US 2001/0004176 A1 Jun. 21, 2001

Related U.S. Application Data

(62) Division of application No. 09/404,377, filed on Sep. 24, 1999.

(51) Int. Cl.[7] ................................................ H02K 15/02

(52) U.S. Cl. ........................... 29/597; 29/596; 310/232; 150/245

(58) Field of Search .......................... 29/597, 596, 598, 29/852, 831, 846; 310/232, 43, 42, 235; 156/245, 306.9, 307.3, 330; 264/137, 258

(56) References Cited

U.S. PATENT DOCUMENTS

| | | | | |
|---|---|---|---|---|
| 1,499,622 A | | 7/1924 | Markwalder | |
| 3,038,138 A | | 6/1962 | Peterson | |
| 3,210,829 A | | 10/1965 | Lipps | |
| 3,246,277 A | | 4/1966 | Sands | |
| 3,314,038 A | | 4/1967 | Rutten | |
| 3,438,123 A | | 4/1969 | Buschbom | |
| 3,594,680 A | | 7/1971 | Buschbom | |
| 4,396,850 A | | 8/1983 | Herr | |
| 4,510,276 A | | 4/1985 | Leech et al. | |
| 4,705,976 A | | 11/1987 | Cacioppo et al. | |
| 4,782,580 A | * | 11/1988 | Cacioppo et al. | 29/597 |
| 4,837,920 A | * | 6/1989 | Sweet et al. | 29/597 |
| 4,871,935 A | | 10/1989 | Sweet et al. | |
| 4,992,691 A | | 2/1991 | Mlynarz | |
| 5,690,498 A | | 11/1997 | Sobhani | |
| 5,734,218 A | * | 3/1998 | Crockett et al. | 310/232 |
| 5,901,429 A | | 5/1999 | Crockett | |
| 5,925,962 A | * | 7/1999 | Kobman et al. | 310/237 |
| 6,161,275 A | * | 12/2000 | Moss et al. | 29/597 |

* cited by examiner

*Primary Examiner*—David P. Bryant
*Assistant Examiner*—Stephen Kenny
(74) *Attorney, Agent, or Firm*—Lowe Hauptman Gilman & Berner, LLP

(57) ABSTRACT

The present invention advantageously provides a cost effective flat rotor for a pancake type slip ring. A flat copper coil sheet is stamped into a corrugated shape having concentric V-ring grooves. The corrugated stamped copper foil sheet is bonded using a bonding agent to a dielectric layer. Multiple concentric V-grooves are formed by separating the grooves, for example, by machining the grooves at an apex thereof in order to form separate electrical circuits. A corresponding plurality of holes extend through each concentric ring and through the dielectric layer from the first side through the second side. A conductive material is placed in each of the plurality of holes to electrically connect each concentric ring to the second side.

10 Claims, 2 Drawing Sheets

PRESSED V-GROOVE PANCAKE SLIP RING

This is a division of application Ser. No. 09/404,377, filed Sep. 24, 1999.

FIELD OF THE INVENTION

The present invention relates generally to pancake type slip rings, and more particularly, to an article and a method for manufacturing a pancake type slip ring.

BACKGROUND OF THE INVENTION

Pancake type slip rings are typically manufactured by plating a dielectric substrate with an electrically conductive material such as copper. Using photo lithographic techniques, the electrically conductive plating is etched to form a plurality of conductive rings. For example, the conductive rings can be formed as disclosed in U.S. patent application Ser. No. 09/246,098, filed Feb. 8, 1999 entitled "ELECTRICAL SLIP RING HAVING A HIGHER CIRCUIT DENSITY" (pending) and U.S. Pat. No. 5,901,429 issued May 11, 1999, entitled "METHOD OF MANUFACTURING COMPOSITE PANCAKE SLIP RING ASSEMBLY", both of which are incorporated herein by reference in their entirety.

The disadvantage with such arrangements is the high cost to manufacture the conductive rings used in the pancake type slip ring. Thus, there is a need in the art for a conductive or a pancake type slip ring in which the cost of manufacturing the pancake type slip ring has been substantially reduced.

SUMMARY OF THE INVENTION

It is, therefore, an object of the present invention to provide a method for manufacturing a rotor for a pancake type slip ring which is economical to produce, cost effective to manufacture and reliable in operation.

It is a further object of the present invention to manufacture a flat rotor for a pancake type slip ring in which the conductive rings have been stamped in a process before being bonded to a dielectric layer.

The present invention advantageously provides a cost effective flat rotor for a pancake type slip ring. A flat copper sheet is stamped into a corrugated shape having concentric V-rings. The corrugated stamped copper foil sheet is bonded using a bonding agent to a dielectric layer. Multiple concentric V-grooves are formed by separating the V-rings, for example, by machining the V-rings at an apex thereof in order to form separate electrical circuits. A corresponding plurality of holes extends through each concentric ring and through the dielectric layer from the first side through the second side. A conductive material is placed in each of the plurality of holes to electrically connect each concentric ring to the second side. Holes are drilled through each of the separate electrical circuits to electrically connect each of the V-rings to a separate foil trace on the back side of the dielectric layer.

These and other objects of the present invention are achieved by a method of manufacturing a flat rotor portion for an electrical slip ring. The method includes a copper foil and bonding the copper foil sheet to a dielectric layer. The grooves are separated to form separate electrical circuits.

The foregoing objects are also achieved by a rotor portion for a pancake type slip ring which comprises a dielectric layer having a first side and a second side. A plurality of concentric rings are each adjacent the first side of dielectric layer. A corresponding plurality of holes extends through each concentric ring and through the dielectric layer from the first side through the second side. A conductive material is placed in each of the plurality of holes to electrically connect each concentric ring to the second side.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

BEST MODE FOR CARRYING OUT THE INVENTION

Figure 1:
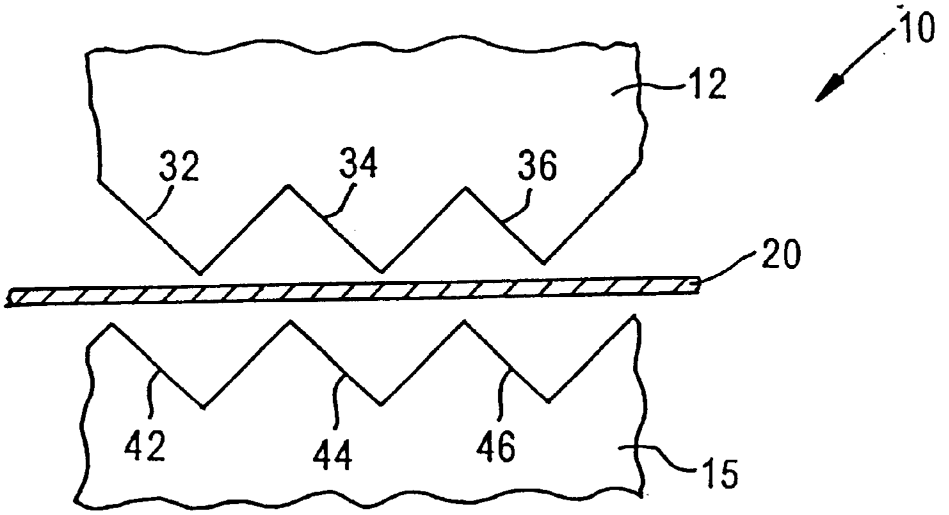
FIG. 1 is a partial side cross-sectional schematic diagram of a tooling fixture used to stamp a copper foil sheet according to the present invention.

Referring now to FIG. 1, a tooling fixture, generally indicated at 10, includes an upper mold 12 and a lower mold 15. A copper foil sheet 20 is placed between the upper and lower mold as depicted in FIG. 1. The copper foil sheet can be a 3 once 0.065 inch thickness copper foil sheet. The upper mold 12 and the lower mold 15 have a plurality of mating corresponding concentric V-shaped surfaces 32, 34, 36 and 42, 42, 46, respectively. It should be understood that any configuration can be used other than v-shaped surfaces for electrical contact within the limits of material to be embossed. When the upper mold 12 and the lower mold 15 are brought together, the copper foil sheet 20 is embossed or stamped with a plurality of concentric V-rings. Although three V-rings are depicted, it should be understood that this is for illustrative purposes only and any number of V-rings or grooves can be used.

Figure 2:
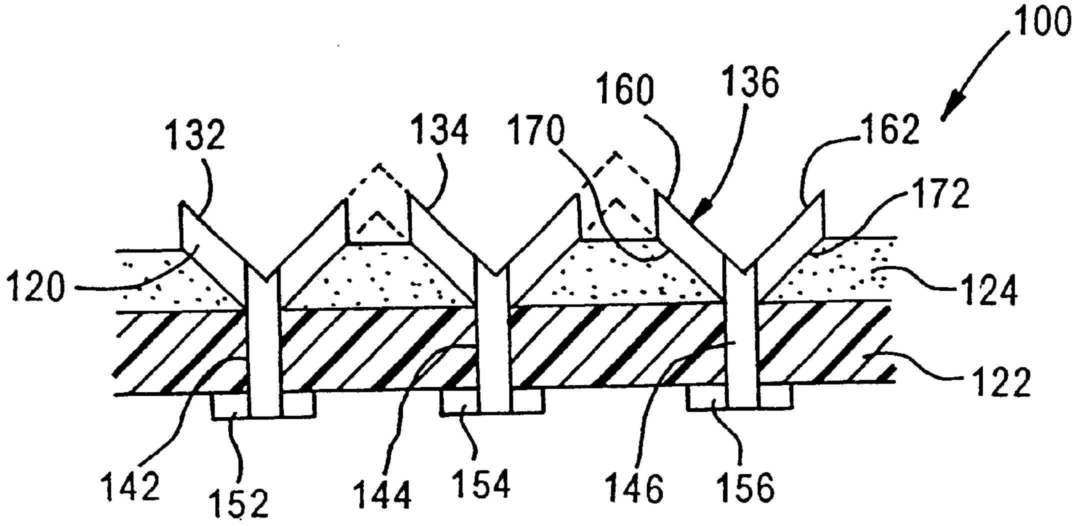
FIG. 2 is a side cross-sectional view of a rotor according to the present invention.

Referring now to FIG. 2, a rotor half, generally indicated at 100, usable with a pancake type slip ring is depicted. For convenience, the rotor half 100 is depicted in a horizontal position, although it should be understood that the rotor half 100 is usable in any orientation. The rotor half 100 is usable in a pancake type slip ring as disclosed in U.S. patent application Ser. No. 09/246,098, filed Feb. 8, 1999 entitled "ELECTRICAL SLIP RING HAVING A HIGHER CIRCUIT DENSITY" and U.S. Pat. No. 5,901,429 issued May 11, 1999 entitled "METHOD OF MANUFACTURING COMPOSITE PANCAKE SLIP RING ASSEMBLY", the disclosures of which are hereby incorporated by reference into this specification in their entirety.

Figure 3A:
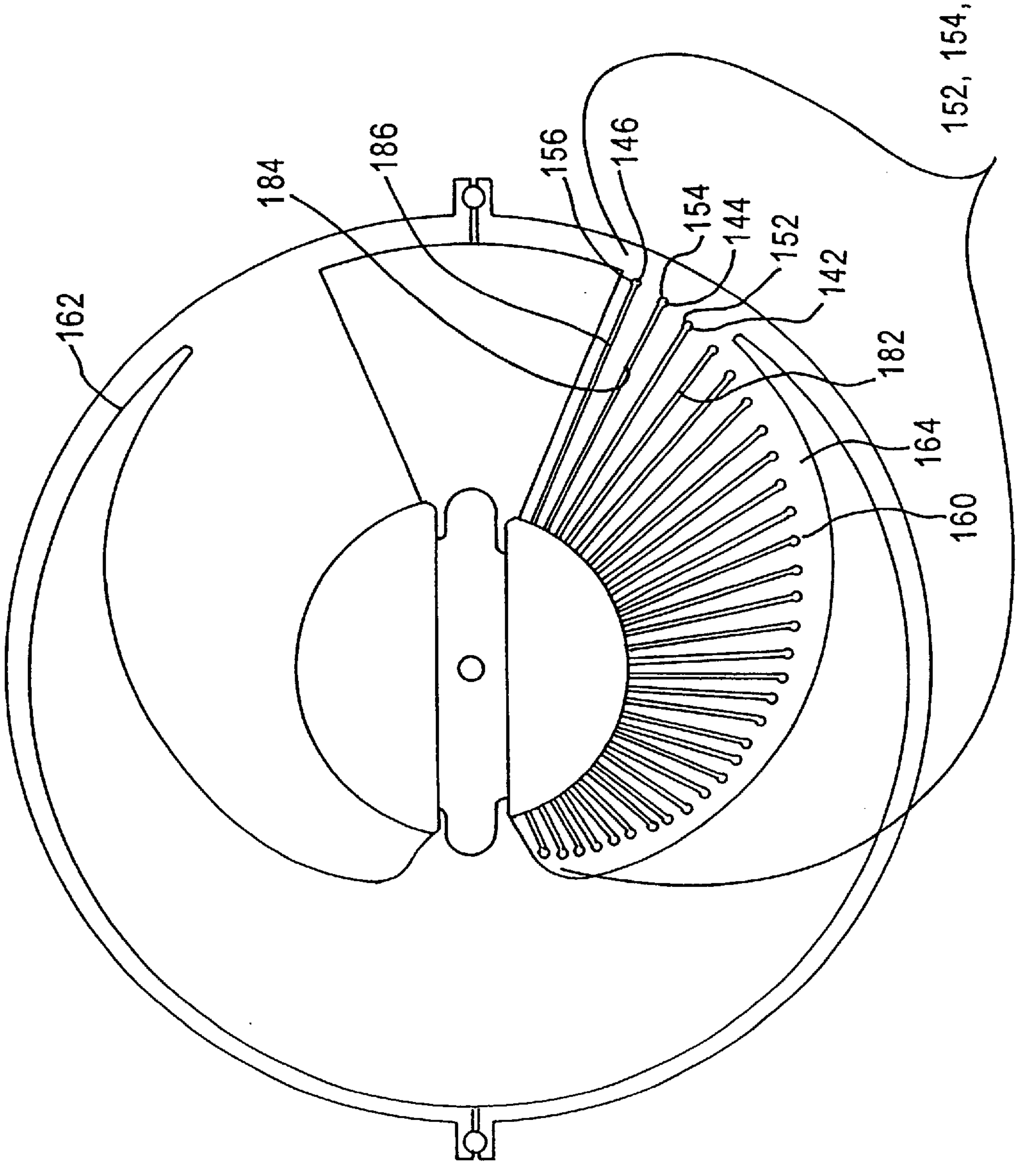
FIG. 3A is a bottom plan view of a portion of the rotor of FIG. 2.
Figure 3B:
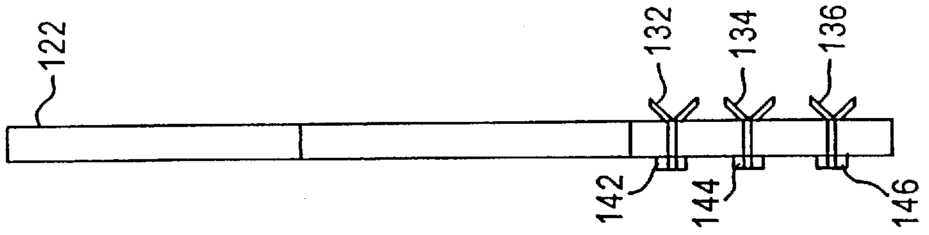
FIG. 3B is an illustration of a partial side elevational view of the rotor portion of FIG. 3A.

As depicted in FIG. 2, the rotor half 100 is formed from a dielectric layer 122, bonding agent 124 and the stamped copper foil sheet 120. The method of forming the rotor half 100 is as follows. The bonding agent 124 is placed upon one surface of the dielectric layer 122. The stamped copper foil sheet 120 is placed on the bonding agent 124. The stamped copper foil sheet 120 is placed on the bonding agent 124 and pressed into the bonding agent 124 such that the lower most apex of each of the V-rings is in contact with the upper surface of the dielectric layer 122. Once the bonding agent has set and bonded the stamped copper foil sheet 120 to the dielectric layer 122, a machining operation is performed separating V-groove 132 from 134 and V-groove 134 from V-groove 136. The portion of the stamped copper foil sheet 120 removed between V-grooves 132, 134 and 136 is indicated with dashed lines. At the bottom apex of each of the V-grooves 132, 134, 136, a corresponding hole 142, 144, 146 is drilled centrally through the V-groove in copper foil sheet 120 and through the dielectric layer 122. A copper foil trace 160 is bonded to a back side of the dielectric layer 122. As depicted in FIG. 3, a top half 162 of the copper foil trace 160 is not etched and a bottom half 164 is etched. As depicted in FIG. 3, a plurality of separate paths 182, 184, 186 are each connected to the rings 152, 154, 156, respectively, so that each conductive ring 132, 134, 136 can be electrically connected to an external electrical connection in a conventional manner. Any number of paths and rings can be used although three are depicted for simplicity. Two rotor halves 100 would be bonded together with the back sides bonded and the v-groove sides facing externally to form a rotor assembly. An electrically conductive material such as metalized epoxy which can be injected or troweled into holes 142–146 is then placed in each of the conductive holes. The assembled rotor 100 can then be assembled into a pancake type slip ring in a conventional manner.

It should now be apparent that an article and a method of manufacture of a rotor for a pancake slip ring have been described which reduces cost to manufacture the rotor and provides a reliable rotor for the pancake type slip ring.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

What is claimed is:

1. A method of manufacturing a flat rotor portion for an electrical slip ring, comprising:

pressing grooves into a copper foil sheet;

bonding the pressed copper foil sheet to a dielectric layer; and separating the grooves to form separate electrical circuits.

2. The method of claim 1, comprising electrically connecting the separated grooves to a back side of the dielectric layer.

3. The method of claim 1, comprising drilling holes through said grooves and said dielectric layer.

4. The method of claim 3, comprising placing a conductive material in each of said drilled holes.

5. The method of claim 1, wherein said pressed grooves have a V-shape.

6. The method of claim 1, wherein said bonding step is performed using a bonding agent and said pressing step presses grooves into the bonding agent.

7. The method of claim 2, comprising attaching a copper foil to the back side of the dielectric layer and forming a plurality of conductive traces with at least one conductive trace for each said respective groove.

8. The method of claim 1, wherein the separating step is machining an annular gap between adjacent grooves.

9. The method of claim 1, wherein each of the grooves is circular.

10. The method of claim 1, comprising placing the copper foil sheet adjacent to the dielectric layer.

* * * * *